US009383218B2

(12) United States Patent
Cragun et al.

(10) Patent No.: US 9,383,218 B2
(45) Date of Patent: Jul. 5, 2016

(54) AUGMENTED REALITY FINANCIAL INSTITUTION BRANCH LOCATOR

(71) Applicant: MX Technologies, Inc., Lehi, UT (US)

(72) Inventors: Jason Cragun, Pleasant Grove, UT (US); Lonnie Kyser, Pleasant Grove, UT (US); Kyle Redfearn, Orem, UT (US)

(73) Assignee: MX TECHNOLOGIES, INC., Lehi, UT (US)

(*) Notice: Subject to any disclaimer, the term of this patent is extended or adjusted under 35 U.S.C. 154(b) by 0 days.

(21) Appl. No.: 13/694,790

(22) Filed: Jan. 4, 2013

(65) Prior Publication Data

US 2014/0244160 A1 Aug. 28, 2014

(51) Int. Cl.
*G01C 21/36* (2006.01)
*G01C 21/20* (2006.01)

(52) U.S. Cl.
CPC .......... *G01C 21/3679* (2013.01); *G01C 21/20* (2013.01); *G01C 21/36* (2013.01)

(58) Field of Classification Search
CPC .................................. H04N 7/18; G08B 7/068
USPC ................................................. 345/619–689
See application file for complete search history.

(56) References Cited

U.S. PATENT DOCUMENTS

| 8,558,847 B2* | 10/2013 | Knize et al. .................... 345/629 |
| 8,670,925 B2* | 3/2014 | Gluck ............................ 701/409 |
| 8,762,041 B2* | 6/2014 | Lindner ............................ 705/3 |
| 2009/0235176 A1* | 9/2009 | Jayanthi ................ H04L 12/189 715/738 |
| 2009/0271287 A1* | 10/2009 | Halpern .................. G06Q 20/10 705/26.1 |
| 2010/0035637 A1* | 2/2010 | Varanasi ............. G01C 21/3682 455/457 |
| 2010/0225756 A1* | 9/2010 | Miyata ........................... 348/116 |
| 2010/0268451 A1* | 10/2010 | Choi .................. G01C 21/3602 701/533 |
| 2011/0040642 A1* | 2/2011 | O'Dell .............. G06F 17/30241 705/26.1 |
| 2011/0153198 A1 | 6/2011 | Kokkas et al. |
| 2011/0199479 A1* | 8/2011 | Waldman ............ G01C 21/3602 348/116 |
| 2012/0105475 A1* | 5/2012 | Tseng ................ G01C 21/3611 345/633 |
| 2012/0209826 A1 | 8/2012 | Belimpasakis |
| 2014/0162598 A1* | 6/2014 | Villa-Real ............... H04M 1/66 455/411 |
| 2014/0195147 A1* | 7/2014 | Gluck .................. G01C 21/367 701/428 |
| 2014/0244159 A1* | 8/2014 | Musabji ............. G01C 21/3638 701/428 |
| 2015/0035685 A1* | 2/2015 | Strickland .............. B60Q 9/008 340/901 |

* cited by examiner

*Primary Examiner* — Adam Tissot
*Assistant Examiner* — Timothy Nesley
(74) *Attorney, Agent, or Firm* — Kunzler Law Group, PC

(57) ABSTRACT

An augmented reality financial institution ("FI") branch locator uses the display screen of a mobile computing device ("MCD") to show a customer that customer's real-world view of physical reality through the camera of the MCD on the MCD display screen ("camera image"), locations of FI branches for that customer's FI overlaid onto the camera image of the customer's physical location, locations of FI branches for competing FI's overlaid onto the same camera image, distances to the various FI branches overlaid onto the camera image, and directions to FI branches overlaid onto the camera image (together "augmented reality") so that the user can navigate from the user's current location to a desired FI branch through the augmented reality image.

15 Claims, 4 Drawing Sheets

US 9,383,218 B2

AUGMENTED REALITY FINANCIAL INSTITUTION BRANCH LOCATOR

BACKGROUND

Prior to the advent of hand-held mobile computing devices ("MCD's") such as the Apple® iPhone® and the like, a person wishing to locate a branch of a financial institution ("FI") could look up the FI in a telephone book and view a list of its branches. A person could then consult a paper map to determine which branch was closest to the person's location, and an appropriate route to travel to that branch. This was a time-consuming and cumbersome process, and along the way the person might pass a closer or more convenient branch of another FI which of course was not provided in the telephone book listing.

Use of the internet would make the prior art process of finding an FI branch marginally more efficient by providing an on-line listing of an FI's branches. In addition, instead of a consulting a paper map, the person could use an online map service such as Google® Maps which would provide an electronic version of the prior art paper map, plus a list of directions for travelling to the desired FI branch location.

However, the FI customer was still left with several undesirable problems. First, the listing of directions provided by a prior art map service was difficult to follow because it typically bore no relationship to the three-dimensional view of a person on a city street attempting to navigate to a desired location. Second, the electronic or paper map bore no relationship to the three-dimensional view of a person navigating to a FI branch. Third, the prior art method did not provide a FI customer with the locations of competing FI branches which may be closer or more convenient and that could serve the customer's needs. Therefore an improved FI branch locator is needed.

SUMMARY

A system, method and software are provided which combine an FI customer's real-world view of physical reality with (a) locations of FI branches and/or Automated Teller Machine ("ATM") for that customer's FI overlaid onto a reality view of the customer's physical location, (b) locations of FI branches and/or ATM for competing or non-partner FI's overlaid onto a reality view of the customer's physical location, (c) distances to the various FI branches overlaid onto a reality view of the customer's physical location, (d) directions to FI branches overlaid onto a reality view of the customer's physical location, (etypes of services offered), (f) partner or non-partner facility, (g) arrows, (h) sized to reflect distance, (i) etc. Combining these various features allows a user to point the camera of an MCD in a desired direction and to view on the display screen of the MCD both the real world physical view which is viewable from the user's physical location, as well as FI branch locations, distances and directions as an augmented reality view. As the user proceeds in any desired direction, the software updates the augmented reality view based upon the user's then-current location, so that the user can follow the augmented reality view to an desired FI branch and/or ATM.

DETAILED DESCRIPTION

Figure 1:
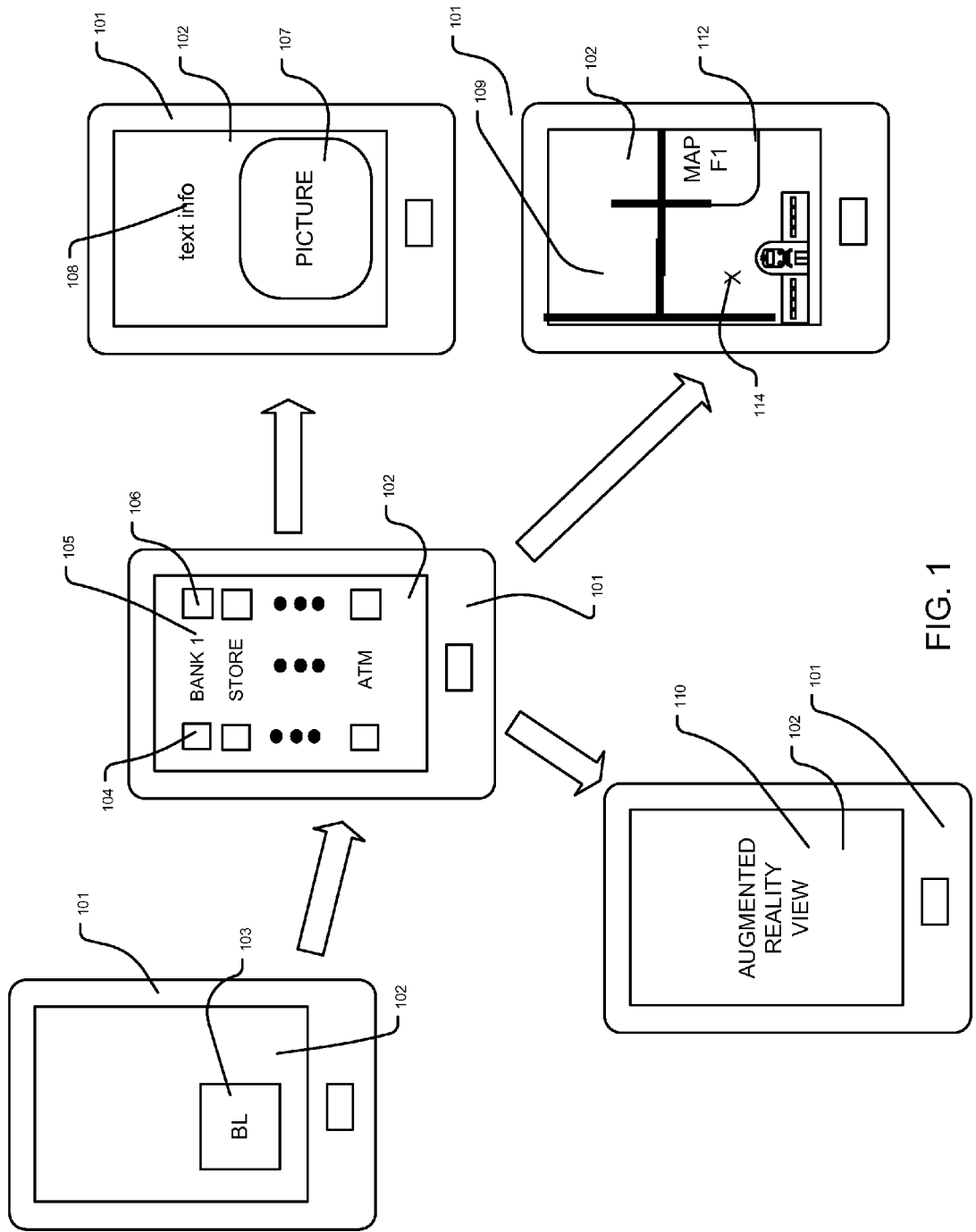
FIG. 1 depicts an example of the invented system, method and software.

Referring to FIG. 1 an example embodiment of the invented system, method and software is depicted. An MCD 101 has a display screen 102 on which a user can view images and information, and through which a user can input commands. Alternatively, commands could be entered through other means such as buttons, a keyboard, a mouse, voice instruction or otherwise. A user or FI customer can use an MCD to run any desired software or app. It is anticipated that the MCD will have GPS (global positioning system) capabilities in order to determine its location on the Earth. It is also anticipated that the MCD will have a camera that can pick up a camera image of the area adjacent the user's physical location. These capabilities are utilized by the invention.

An example of software or an app that can be run on an MCD is mobile banking software. Such software may in some cases provider the user with a button 103 for banking location (or FI location). When that button is pressed or selected, the screen 102 then displays a list of FI's which can include a logo 104 indicating the type of FI (such as main office, bank branch, ATM machine, store with ATM, etc.). The list can also provide the names 105 of the FI's and other information 106 such as the distance from the user's present GPS location to the FI in question.

If the user selects one of the FI's, the user can obtain three different types of information. General contact information for the FI in text form 108 can be provided, along with an image or picture 107 of the FI so that the user will know what to expect upon arrival at that location. Information that may be included about an FI can include FI name, location name, distance from the user's GPS position, address, phone, hours, type of branch (lobby, drive-up, ATM, etc.), services offered, an image of the FI branch, a description of the branch, tips on finding the branch, languages spoken at the branch, user comments about the branch, and crime statistics about the branch (such as, "This ATM is a robbery hot spot").

Also, the user can obtain a traditional-style map 109 of the location of the FI 112 relative to the user's current GPS location 114.

And the user can obtain an augmented reality view 110 of the FI which overlays FI information and directions on a camera image of local reality for the user. This function, generally referred to as a "branch locator" function, uses the display screen of the MCD to show a customer that customer's real-world view of physical reality through the camera of the MCD on the MCD display screen ("camera image"), locations of FI branches for that customer's FI overlaid onto the camera image of the customer's physical location, locations of FI branches for competing FI's overlaid onto the same camera image, distances to the various FI branches overlaid onto the camera image, and directions to FI branches overlaid onto the camera image (together "augmented reality image") so that the user can navigate from the user's current location to a desired FI branch through the augmented reality image.

As the user travels, such as by foot or by automobile, in any direction, the software updates the user's then-current GPS location, updates the camera view, and provides the user with an updated augmented reality image at desired intervals so that the user may follow directions on the MCD screen from an initial location to a desired FI branch location. Directions will appear on the screen, such as a left arrow instructing the user to take a left turn, a right arrow for instructing the user to take a right turn, and a straight ahead arrow instructing the user to proceed straight ahead. Relative distances may be placed on the augmented reality image, such as a straight ahead arrow with "300 feet" beside indicating to the user to proceed straight ahead for 300 feet. The augmented reality image also shows the user physical reality, a camera image in the user's direction of travel from the user's current position. That allows the user to look at the screen of the MCD to obtain directions for travel, and then look up to physical three-dimensional reality in order to see the same physical structures depicted in the augmented reality image, and in order to follow the travel instructions from the augmented reality image in physical reality.

Figure 2:
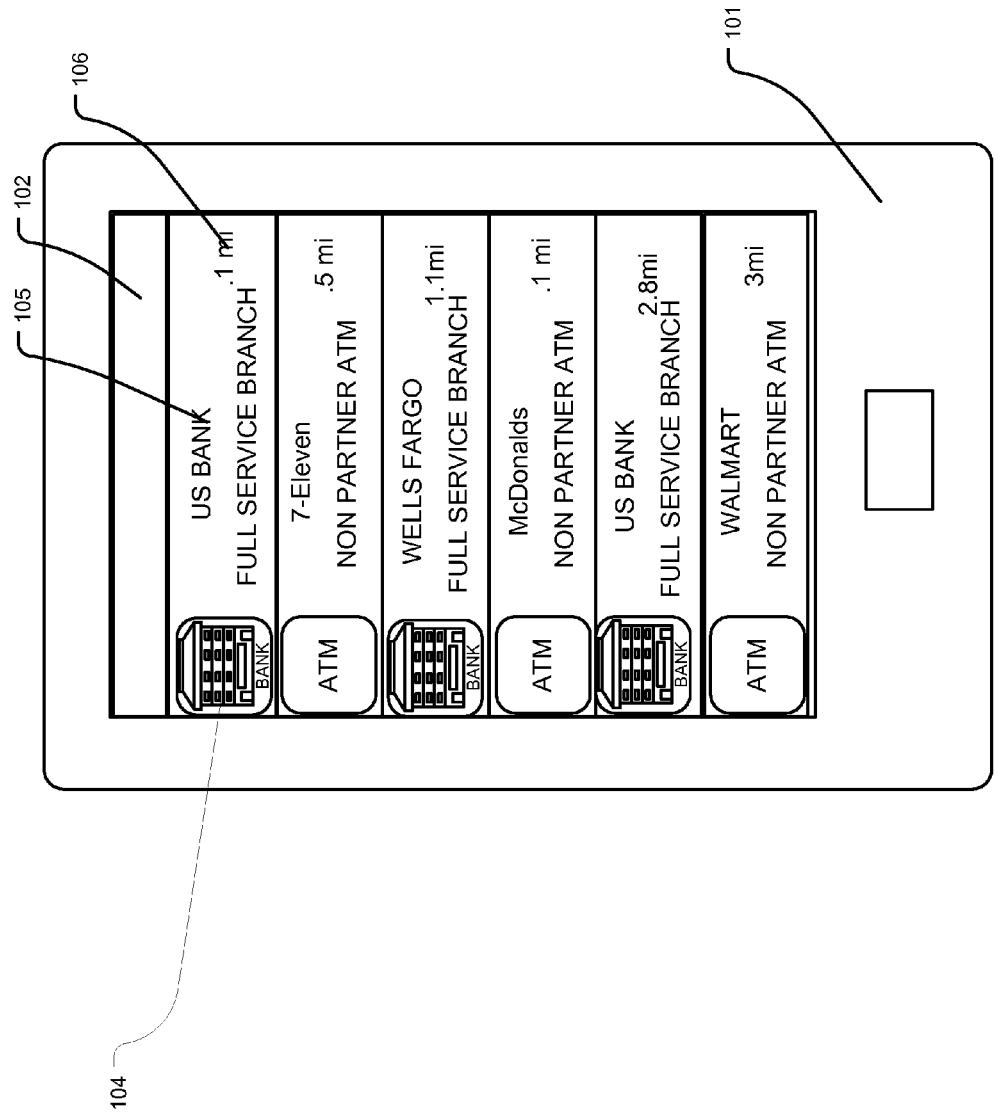
FIG. 2 depicts greater detail of an example list of FI's which may be presented to an MCD user.

Referring to FIG. 2, greater detail of an example list of FI's which may be presented to an MCD user, is depicted.

Figure 3:
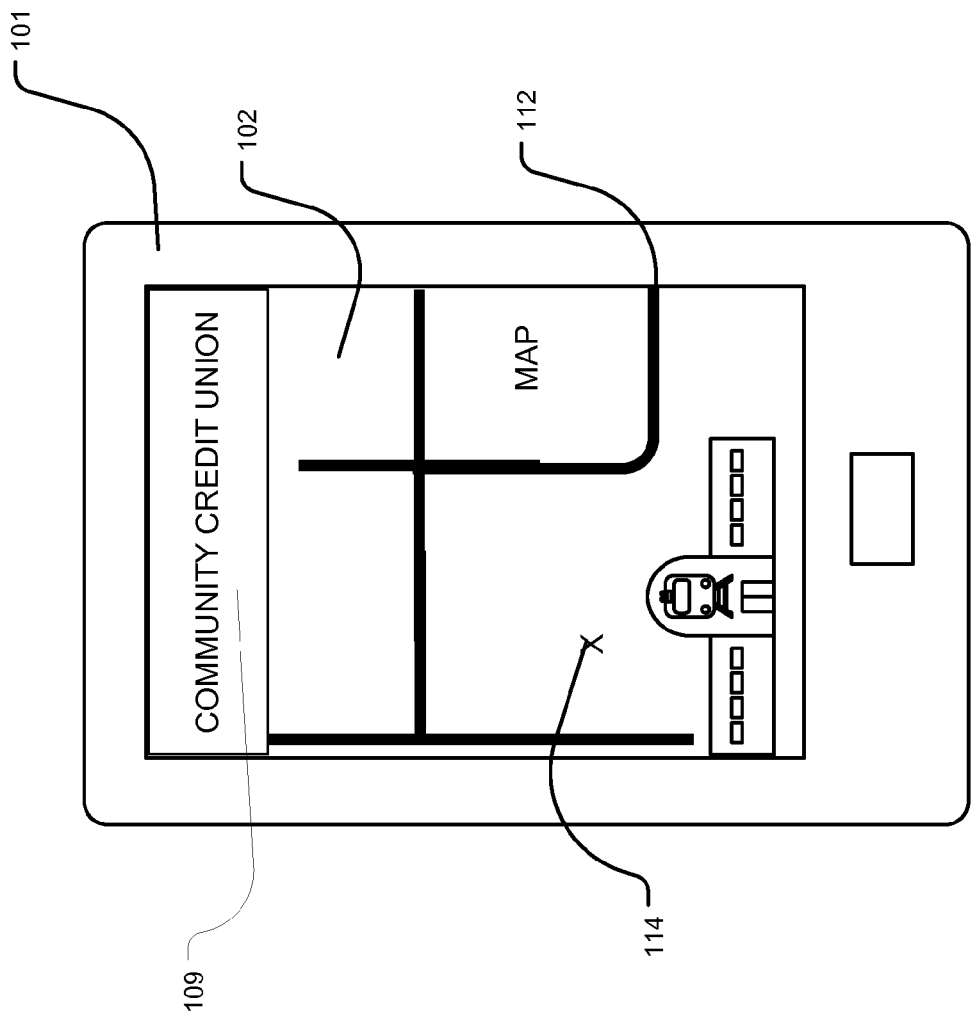
FIG. 3 depicts greater detail of an example map which may be presented to an MCD user.

FIG. 3 depicts greater detail of an example map which may be presented to an MCD user.

Figure 4:
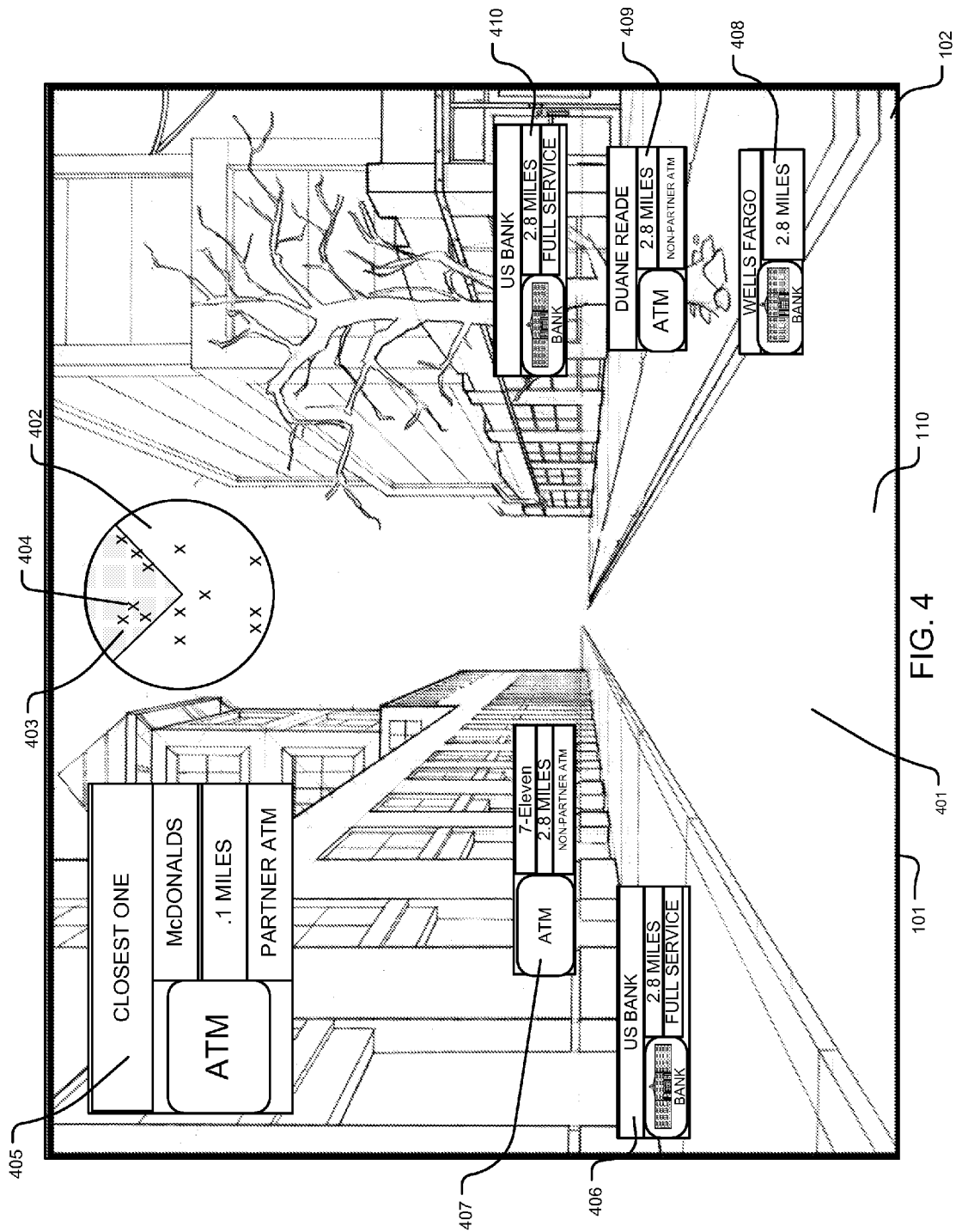
FIG. 4 depicts an example augmented reality view presented to a user of the present invention.

FIG. 4 depicts an example augmented reality view presented to a user of the present invention. The MCD 101 has a screen 102 on which an augmented reality image 110 can be displayed. The augmented reality image includes a camera image 401 taken from the user's location. The augmented reality image also includes a radar image or map of nearby FI's within user-selected parameters such as 10 miles. The map 402 in this instance has shading 403 to indicate the direction that the augmented reality image is facing. FI branches 404 are indicated by dots or other symbols. The augmented reality image 110 also includes information about the closest FI 405. In this case it is indicated to be an ATM at a McDonalds® restaurant. The augmented reality image 110 also includes information about other FIs 406-410 in the direction that the user is facing. The augmented reality image 110 includes key information about such other FIs, such as distance, whether it is a full service branch, a non-partner ATM, a non-partner branch, or a partner ATM. Each FI balloon may be clicked on in order to gain detailed information about that particular branch FI.

The augmented reality image may display FI branches that are close as being relatively larger than those which are farther away, providing the user with intuitive distancing information.

Another useful feature is using an arrow on the augmented reality image to indicate which FI branch is closest to the user's GPS location. Displaying a bubble with identifying information for that FI which is larger than any other FI branch bubble can convey the same information.

When user conducts an FI search, the search function populates a list of FI's. Next to the information for each FI is an arrow indicating the physical direction that the user would travel from the user's current GPS location to proceed to that branch.

When the user clicks on an FI, the graphic for that FI flips to open and flips to close, in the same way that a card can be peeled from a deck of cards and flipped over.

The branch locator feature indicates whether each FI is a partner or non-partner ATM, so that the user will know whether that ATM will charge the user an additional transaction fee. As those transaction fees tend to be both high and annoying, this is important information to the user.

The invention can be implemented as software that runs on a mobile digital computer. The state of technology and trends as of the time of writing this document indicates that digital computers running software will be a preferred implementation for many years to come. Mobile computing devices are typically specialized digital computers that are small enough to be transported by hand.

Commonly a computing device for using the invention will include a display device such as a screen or other image on which information can be displayed to a user, an input device through which a user can control the computing device, and a processor for carrying out computations as required by the invention. The computing device may also include a means for carrying wireless transmission and receipt of data, dynamic memory, static memory, a power source such as a battery, and other features.

The invention makes use of GPS information. GPS information is obtained from satellites positioned in various locations around the earth and tends to be accurate within a few feet, which is sufficiently accurate for the purpose of assisting a user in walking to a bank.

The invention also uses information about the direction the user is facing in order to populate the augmented reality image.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for assisting a user in finding a financial institution branch, the method comprising:
    on a mobile computing device having a display screen, displaying a button for a user to select use of a branch locator function;
    when the branch locator function is selected by the user, ascertaining the user's current global positioning system (GPS) location according to a global positioning system;
    assembling a list of financial institution branches within a predetermined distance of the user's current GPS location, wherein the list comprises financial institution branches of which the user is a customer and competing financial institution branches of which the user is not a customer;
    for different financial institution branches in the list, determining different logos indicating which of the different financial institution branches comprises a main office, which comprises a bank branch, and which comprises a store, wherein main offices, bank branches, and stores offer different types of services than each other;
    for each financial institution branch in the list, determining a distance from the user's current GPS location to the branch;
    displaying the list on the display screen, together with the logos and the distances, on the displayed list, indicating which branch is closest to the user's current GPS location;
    on the displayed list, for each branch, displaying an arrow indicating a general direction of travel that the user would take in order to proceed to the branch;
    when greater detail about a particular financial institution branch is selected by the user, displaying to the user on the display screen contact information for the branch, descriptive information for the branch, and a pictorial representation of the branch;

when a map for the particular financial institution branch is selected by the user, displaying to the user on the display screen a map indicating relative locations of the user and of the branch;

when an augmented reality image for the particular financial institution branch is selected by the user, displaying to the user on the display a photograph taken from the user's current GPS location and directional orientation, and overlaying on the photograph (i) locations of financial institution branches, (ii) distances to each branch, (iii) whether each branch is a partner or non-partner branch of which the user is a customer, and (iv) directions of travel to reach each branch;

overlaying a radar image type visualization on the augmented reality image depicting a user's field of view and a position, relative to the user, of each financial institution branch within a predetermined distance of the user's current GPS location in all directions regardless of a direction of the user's field of view;

when the financial institution branch is selected by the user, displaying on the display screen an animated image of the selected branch flipping over as a card being peeled and flipped over to indicate the financial institution branch has been selected; and as the user moves from his or her current GPS location to a new location, updating the photograph with a new photograph taken from the user's new current location, and creating a new augmented reality image with the new photograph and new branch, distance, and direction of travel information.

2. A method as recited in claim 1, wherein each financial institution branch on the augmented reality image is represented by a bubble, and bubbles are sized based on relative distances from the user's current GPS location, with a closest displayed branch being represented by a biggest bubble and a farthest displayed branch being represented by a smallest bubble.

3. A method as recited in claim 1, wherein on the augmented reality image, a closest displayed branch to the user's current GPS location is indicated by an arrow pointing to it.

4. A method as recited in claim 1, wherein crime information for each branch is provided in the list.

5. A method as recited in claim 1, wherein crime information is provided for each branch displayed on the augmented reality image.

6. A method as recited in claim 1, further comprising shading a portion of the radar image to indicate a direction that the user is facing.

7. A method for assisting a user in finding a financial institution branch, the method comprising:

on a mobile computing device having a display screen, and a camera, taking a photograph from the user's current global positioning system (GPS) location and displaying it on the display screen;

on the display screen, creating an augmented reality image by overlaying the photograph with financial institution branch location information;

on the augmented reality image, indicating which branch is closest to the user's current GPS location;

on the augmented reality image, overlaying a radar image type visualization depicting a user's field of view and a position, relative to the user, of each financial institution branch within a predetermined distance of the user's current GPS location in all directions regardless of a direction of the user's field of view;

for different financial institution branch locations, determining different logos indicating which of the different financial institution branch locations comprises a main office, which comprises a bank branch, and which comprises a store, wherein main offices, bank branches, and stores offer different types of services than each other;

displaying the logo indicating the type of each branch on the augmented reality image; and when a financial institution branch location is selected by the user, displaying on the display screen an animated image of the selected branch flipping over as a card being peeled and flipped over to indicate the financial institution has been selected.

8. A method as recited in claim 7, further comprising, on the augmented reality image, indicating distances to branches displayed.

9. A method as recited in claim 7, further comprising, on the augmented reality image, indicating whether each branch is a partner or non-partner branch.

10. A method as recited in claim 7, further comprising, on the augmented reality image, indicating crime information for each branch.

11. A method as recited in claim 7, further comprising, on the augmented reality image, indicating whether each branch is an automated teller machine or a full-service banking location.

12. A method as recited in claim 7, further comprising, on the augmented reality image, indicating directions of travel to each branch.

13. A method as recited in claim 7, further comprising, as the user moves from the current GPS location to a new GPS location, updating the augmented reality image with a new photograph taken from the user's new GPS location, and updating information concerning branch locations at the new GPS location.

14. A method as recited in claim 13, further comprising, on the updated augmented reality image, providing updated information concerning a direction of travel to a selected branch.

15. A method as recited in claim 13, further comprising, on the updated augmented reality image, providing updated directions to the selected branch.

* * * * *